US008582826B2

(12) United States Patent
Keskes et al.

(10) Patent No.: US 8,582,826 B2
(45) Date of Patent: Nov. 12, 2013

(54) METHOD OF PROCESSING SEISMIC IMAGES OF THE SUBSURFACE

(75) Inventors: Noomane Keskes, Pau Cedex (FR); Sebastien Guillon, Pau Cedex (FR); Jean-Pierre Dunand, Pau Cedex (FR)

(73) Assignee: Total SA, Courbevoie (FR)

( * ) Notice: Subject to any disclaimer, the term of this patent is extended or adjusted under 35 U.S.C. 154(b) by 619 days.

(21) Appl. No.: 12/741,238

(22) PCT Filed: Nov. 3, 2008

(86) PCT No.: PCT/EP2008/064893
§ 371 (c)(1),
(2), (4) Date: May 4, 2010

(87) PCT Pub. No.: WO2009/059951
PCT Pub. Date: May 14, 2009

(65) Prior Publication Data
US 2010/0232651 A1    Sep. 16, 2010

(30) Foreign Application Priority Data
Nov. 6, 2007    (FR) ...................................... 07 07794

(51) Int. Cl.
*G06K 9/00*    (2006.01)

(52) U.S. Cl.
USPC ................................ 382/109; 702/14; 367/14

(58) Field of Classification Search
None
See application file for complete search history.

(56) References Cited

U.S. PATENT DOCUMENTS

| 5,671,136 | A | 9/1997 | Willhoit, Jr. | |
| 6,138,075 | A | 10/2000 | Yost | |
| 6,771,800 | B2 * | 8/2004 | Keskes et al. | 382/109 |
| 7,257,488 | B2 * | 8/2007 | Cacas | 702/2 |
| 7,328,139 | B2 | 2/2008 | Dulac et al. | |
| 2006/0129359 | A1 | 6/2006 | Dulac | |
| 2006/0247858 | A1 | 11/2006 | Cacas | |
| 2008/0059074 | A1 * | 3/2008 | Wei et al. | 702/16 |
| 2009/0122061 | A1 * | 5/2009 | Hammon, III | 345/424 |

FOREIGN PATENT DOCUMENTS

| EP | 1717604 | 11/2006 |
| FR | 2869693 | 11/2005 |
| WO | 9711392 | 3/1997 |
| WO | 04001450 | 12/2003 |

OTHER PUBLICATIONS

Faucon T., et al: "Application of surface topological segmentation to seismic imaging", Discrete Geometry For Computer Imagery, 13th International Conference, DGCI 2006, Proceedings (Lecture notes In Computer Science vol. 4245) Springer Berlin, Germany, 2006, pp. 506-517, XP002488822 ISBN 3-540-47651-2.
Faraklioti M., et al: "Horizon picking in 3D seismic data volumes", Machine Vision And Applications Springer-Verlag Germany, vol. 15, No. 4, Oct. 2004, pp. 216-219, XP002488381, ISSN: 0932-8092.
Admasu F., et al: "Autotracking of faults on 3D seismic data", Geophysics Soc. Exploration Geophysicists USA, vol. 71, No. 6, Nov. 2006, pp. A49-A53, XP002488382, ISSN: 0016-8033.

\* cited by examiner (Continued)

*Primary Examiner* — Shefali Goradia
(74) *Attorney, Agent, or Firm* — Patterson Thuente Pedersen, P.A.

(57) ABSTRACT

The processing comprises an analysis of a seismic image to estimate seismic horizons in an area of the subsurface and the calculation of an accumulation value associated with each pixel of the seismic image by accumulation along a set of estimated seismic horizons to form a synthesized image composed of accumulation values. This synthesized image is transformed to obtain a seismic representation in which signed amplitudes are allocated to the pixels of the synthesized image. The transformation may comprise a combination with the original seismic image or else a convolution with a wavelet or another convolution kernel.

16 Claims, 3 Drawing Sheets

METHOD OF PROCESSING SEISMIC IMAGES OF THE SUBSURFACE

BACKGROUND OF THE INVENTION

The present invention relates to the analysis of seismic images of the subsurface.

It is known, especially in oil exploration, to determine the position of oil reservoirs from the results of geophysical measurements carried out from the surface or in well bores. In the technology of reflection seismology technology, these measurements involve emitting a wave into the subsurface and measuring a signal comprising diverse echoes of the wave on geological structures being investigated. These structures are typically surfaces separating distinct materials, faults, etc. Other measurements are carried out from wells. Acoustic waves or electromagnetic radiation are then sent into the subsurface.

The measurements are processed to recreate a model of the subsurface, generally in the form of seismic images or echographic images. These images may be two-dimensional (seismic sections) or three-dimensional (seismic blocks). A seismic image consists of pixels, the intensity of which represents a seismic amplitude depending on local impedance variations.

Geophysicists are used to analyzing such seismic images bearing amplitude information. By visual observation they are able to separate subsurface areas having different characteristics with a view to determining the structure of the subsurface.

Automatic methods exist for extracting structural information from seismic images. In particular, it is known to estimate seismic horizons by computer analysis of the amplitude gradients in the seismic image. The horizons thus estimated are called "synthesized horizons" in contrast with horizons determined by manual checking of the images.

One possible method for estimating horizons in a two-dimensional seismic image consists in investigating, starting from one pixel of the image, the direction along which the local amplitude gradient is minimal. By propagating in this direction, a line representing a synthesized horizon is gradually constructed. If the seismic image is three-dimensional, it is possible to estimate horizons in the form of surfaces transverse to the vertical direction, for example by means of the propagation method described in French patent No. 2 869 693.

Synthesized horizons may be processed to generate accumulation values (or synthesized accumulation values) forming a synthesized image, having the same dimensions as the seismic image, containing structural information on the organization of the subsurface. The accumulation values are, for example, calculated on a computer as follows. Starting from each pixel of the seismic image, a horizon is estimated by a gradient propagation method and a value of one is allocated to each pixel of this estimated horizon and a value of zero is allocated to all the other pixels. The sum of the values (1 or 0) allocated to each pixel of the synthesized image in relation to the horizons coming from the various pixels of the seismic image yields an accumulation value. High accumulation values correspond in particular to areas of the image where different horizons converge, while low values instead represent areas where the physical characteristics are relatively homogeneous.

The images formed by the synthesized accumulation values may be transformed in the way described in U.S. Pat. No. 6,771,800 to carry out a chrono-stratigraphic analysis of the seismic images. The transformation is nonlinear and calculated by integrating accumulation values along vertical lines. It provides conversion from a physical time scale to a pseudo-geological time scale. The transformed image has connected components that can be interpreted as corresponding to geological deposits, demonstrating geological hiatuses between them.

Synthesized images calculated by accumulation along estimated horizons constitute a sort of summary of the structural information and are therefore very useful for getting an idea of the geometry of the subsurface. The information they visualize is more structural than lithological, as they no longer involve the seismic amplitude values but only their continuities and discontinuities. This limits their interest to geophysicists, who often prefer to examine seismic images themselves, despite the difficulty they might have in distinguishing the structure in these.

SUMMARY OF THE INVENTION

The present document introduces a new type of seismic image processing which reconciles advantages of various modes of representation. Thus a method for processing seismic images of the subsurface is proposed, comprising the steps of:
- analyzing a seismic image to estimate seismic horizons in an area of the subsurface;
- calculating an accumulation value associated with each pixel of the seismic image by accumulation along a set of estimated seismic horizons to form a synthesized image composed of accumulation values; and
- transforming the synthesized image to obtain a seismic representation in which signed amplitudes are allocated to the pixels of the synthesized image.

The synthesized images are reprocessed to return to a mode of representation close to that of the original seismic image. The seismic representation may be seen as a seismic image enhanced by the addition of structural information coming from the synthesized image. This makes reading and interpreting the images easier.

In one implementation of the method, the calculation of an accumulation value associated with a pixel of the seismic image comprises accumulating signed quantities respectively associated with horizons of said set passing through said pixel, the signed quantity associated with a horizon depending on the sign of the amplitude of a starting pixel of said horizon in the seismic image.

The synthesized images thus generated are generally less clear than those obtained by accumulation of always positive quantities. However, their signed amplitudes convey some physical information linked with variations in impedance. The step of transforming such a synthesized image may comprise a spatial convolution of this synthesized image with a convolution kernel such as a wavelet, which provides a more realistic representation of seismic amplitudes.

In another implementation of the method, the step of transforming the synthesized image comprises combining the synthesized image with the seismic image.

The combination of the synthesized image with the seismic image may in particular be a product per pixel in the form $P(x, y) = A(x, y)_\alpha \times S(x, y)^\beta$, where $P(x, y)$ is the value of a pixel in said seismic representation, $A(x, y)$ is the accumulation value of said pixel in the synthesized image, $S(x, y)$ is the amplitude of said pixel in the seismic image, and $\alpha$ and $\beta$ are two positive exponents.

Another aspect of the invention relates to a computer program for a system for processing seismic images of the subsurface, the program comprising instructions for implementing the steps of a method such as defined above when the program is run by a computer of the seismic image processing system.

BRIEF DESCRIPTION THE DRAWINGS

Other particular features and advantages of the present invention will become apparent in the description below of non-limiting exemplary embodiments with reference to the appended drawings, in which.

DESCRIPTION OF PREFERRED EMBODIMENTS

Figure 1:
FIG. 1 shows an exemplary record of a seismic image.

With reference to FIG. 1, a seismic image is commonly in the form of an array of pixels with intensities corresponding to seismic amplitudes. The representation is generally in two colors (not rendered in the figure), one for negative amplitudes, the other for positive amplitudes. When it is two-dimensional, the image may correspond to a two-dimensional integration of vertical seismic traces. It may also correspond to a vertical section through a seismic block obtained by three-dimensionally integrating vertical seismic traces.

Figure 2:
FIG. 2 shows a form of synthesized image obtained from the seismic image of FIG. 1.

In a manner known per se, such a seismic image may be processed to generate a synthesized image such as that shown in FIG. 2 by accumulation along estimated seismic horizons. The synthesized image is, for example, represented monochromatically with grey shades that are darker the higher the accumulation values of the pixels. In the case of FIG. 2, these accumulation values are all positive.

Figure 3:
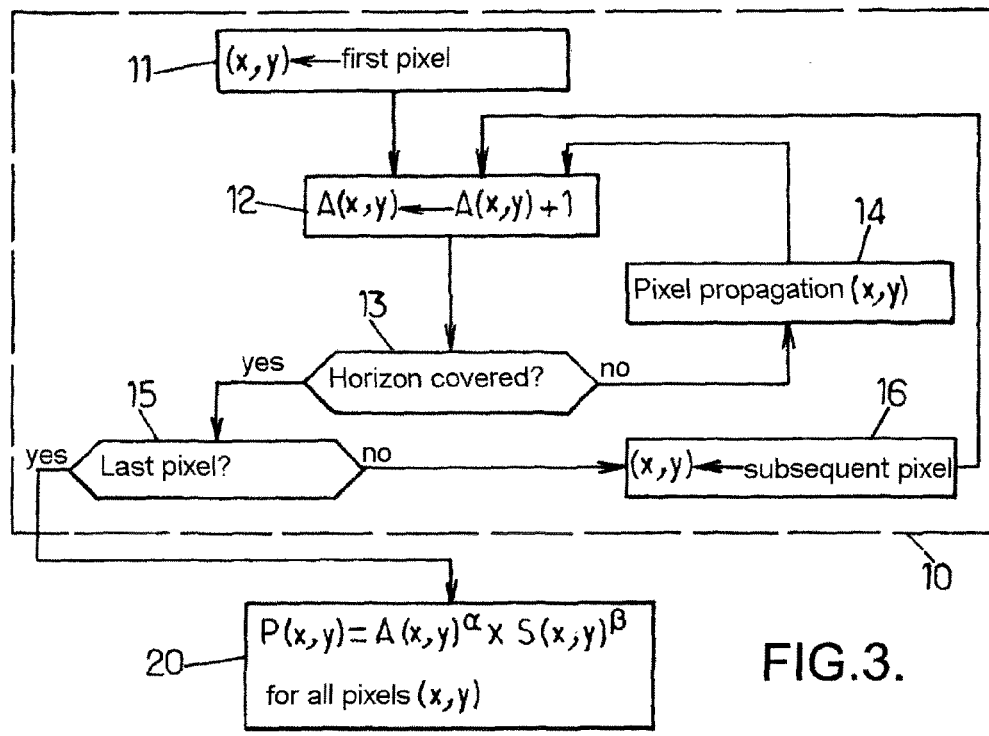
FIG. 3 is a flow chart of an exemplary embodiment of the seismic image processing method.

The synthesized image shown in FIG. 2 has been derived from the seismic image of FIG. 1 by the conventional method mentioned in the introduction, implemented for example according to the procedure 10 illustrated in FIG. 3.

This procedure 10 comprises estimation of a horizon for each pixel of the seismic image and calculation of accumulation values $A(x, y)$ for each of the pixels. A first starting pixel $(x, y)$ is selected in step 11. The accumulation takes place in step 12 by incrementing by a unitary value the accumulation value $A(x, y)$. If the current seismic horizon has not been completely covered (test 13), i.e. if the propagation has not yet reached the two lateral edges of the image, a subsequent pixel $(x, y)$ of the current horizon is selected in step 14 before returning to the accumulation step 12. The selection is effected in step 14 by choosing a neighboring pixel in a direction of propagation chosen depending on local amplitude variations in the seismic image. When test 13 reveals that the current seismic horizon has been completely covered, the procedure determines in test 15 whether all the starting pixels have been taken into account. A new starting pixel is taken for the pixel $(x, y)$ in step 16 as long as test 15 is negative, and the procedure returns to step 12 to propagate a horizon from this starting pixel and update the accumulation values of the pixels encountered along this horizon. The synthesized image consisting of accumulation values $A(x, y)$ is terminated when test 15 reveals that all the starting pixels have been taken into account.

In order to allocate signed amplitudes to the pixels of such a synthesized image, it is transformed by combining it with the original seismic image.

In the example illustrated by FIG. 3, the combination is carried out in the form of a product pixel by pixel:

$$P(x,y)=A(x,y)^\alpha \times S(x,y)^\beta \qquad (1)$$

where $S(x,y)$ is the value of pixel $(x, y)$ in the original seismic image and $P(x, y)$ is the value of pixel $(x, y)$ in the seismic representation resulting from the transformation of the synthesized image.

The exponents $\alpha$ and $\beta$ may be adapted to the needs of each particular application. In order to search for oil reservoirs, it has been determined that the values $\alpha=\frac{1}{2}$, $\beta=1$ are satisfactory.

Figure 4:
FIG. 4 shows a seismic representation structurally enhanced according to the method illustrated by FIG. 3.

FIG. 4 shows the seismic representation obtained with the exponent values $\alpha=\frac{1}{2}$, $\beta=1$ from the synthesized image of FIG. 2 combined with the seismic image of FIG. 1. As the representation is of the same type as in the seismic image, it may also be in two colors (not rendered in the figure), one for negative amplitudes, the other for positive amplitudes, with the pixel intensities corresponding to the absolute value of the seismic amplitudes reallocated to the pixels of the synthesized image.

The structural enhancement provided to the seismic image of FIG. 1 can be seen in FIG. 4. The structural information added comes from the synthesized image of FIG. 2, and allows in particular the geological structure in the left part of the seismic image, that with the most noise, to stand out. In the right part too, where the noise is relatively less significant, the structural enhancement provides accentuation that makes the interpretation of seismic data easier. Generally speaking, a geophysicist observing a seismic representation of the kind in FIG. 4 is able to proceed with the customary interpretations while benefiting from the structural enhancement.

Figure 5:
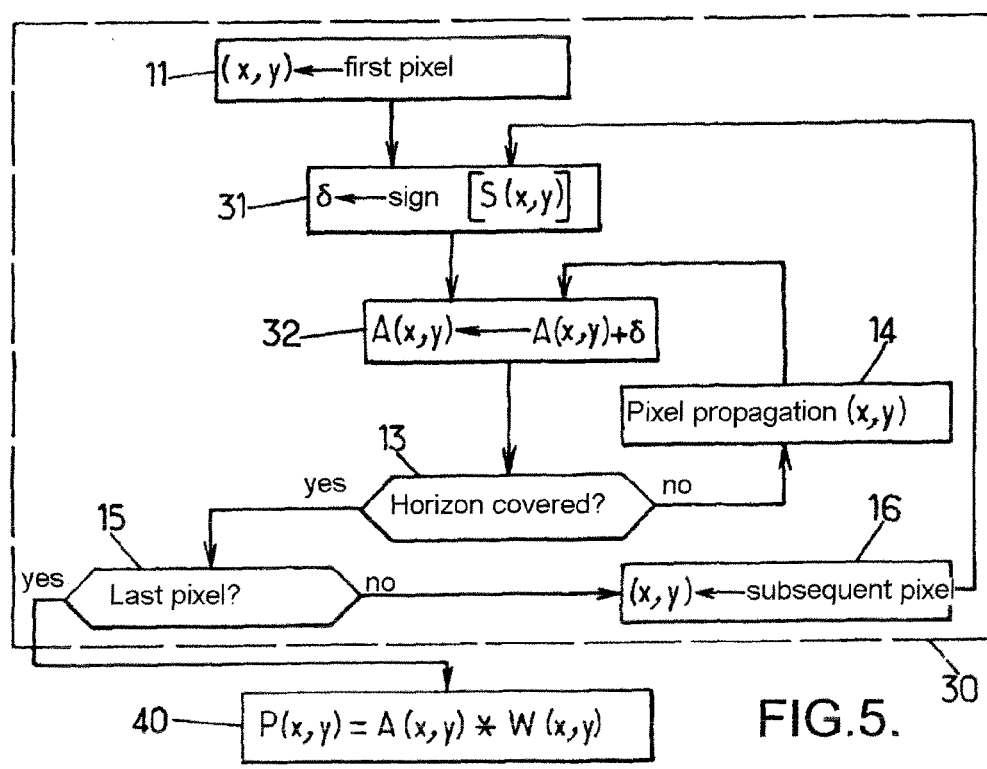
FIG. 5 is a flow chart of another exemplary embodiment of the seismic image processing method.

FIG. 5 illustrates another exemplary embodiment of the method, which can be applied as a variant of FIG. 3 to produce a rendering that is both lithological and structural from seismic images.

The procedure 30 for generating the synthesized image is modified in relation to that 10 of FIG. 3 so as to take account of the sign of the seismic amplitudes at the starting pixels. This procedure 30 is very close in its execution to that 10 of FIG. 3, the steps designated by the same reference number being identical.

After selecting the starting pixel for estimating a horizon, in step 11 or 16, a signed quantity $\delta$ is determined in step 31 as corresponding to the sign of the starting pixel in the seismic image: $\delta=+1$ if $A(x, y) \geq 0$ and $\delta=-1$ if $A(x, y)<0$. It is this signed value $\delta$ that is added (in step 32, executed after each step 31 or 14) to the accumulation values $A(x, y)$ of the pixels encountered along the estimated horizon for the current starting pixel.

Figure 7:
FIG. 7 shows a seismic representation structurally enhanced according to the method illustrated by FIG. 5.
Figure 6:
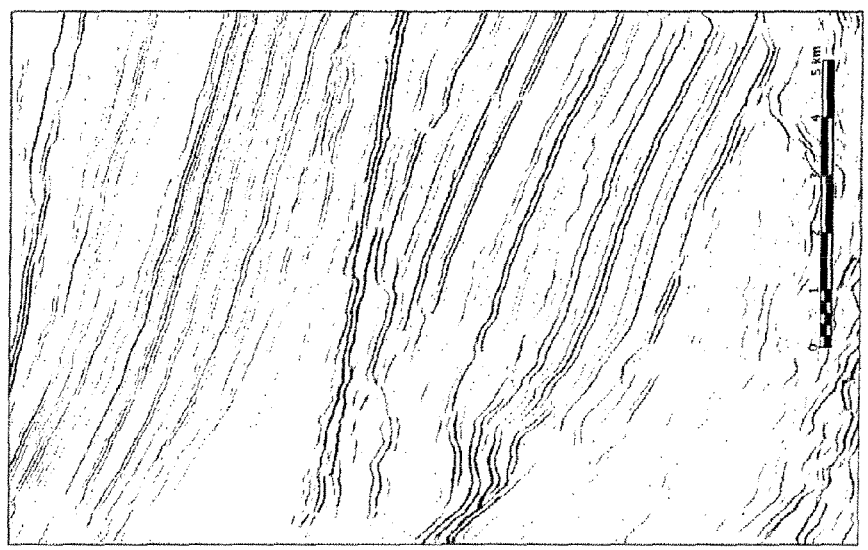
FIG. 6 shows another form of synthesized image used in the method illustrated by FIG. 5.

The synthesized image which results from this looks as shown in FIG. 6 for the case of the seismic image of FIG. 1. Here, the representation is, for example, in two colors (not rendered in the figure), one for negative amplitudes, the other for positive amplitudes, with the pixel intensities corresponding to the absolute value of the signed accumulation values. It can be seen that the rendering of the structure is less accentuated than in the example of FIG. 2. However, a piece of signed information is taken into account and, in order to obtain a rendering of the seismic type (FIG. 7), the synthesized image is transformed in step 40 by applying to it a spatial convolution with a convolution kernel W(x, y), which is symbolically designated P(x, y)=A(x, y)*W(x, y).

In practice it suffices to carry out the convolution operation along the vertical direction (x):

$$P(x, y) = A(x, y) * W(x) \quad (2)$$
$$= \int_u A(x-u, y) \cdot W(u) \cdot du$$

The convolution kernel W(x) used in equation (2) may in particular be a wavelet such as, for example, a Ricker wavelet of the form:

$$W(x) = \frac{A}{\sigma^2} \cdot \left(\frac{x^2}{\sigma^2} - 1\right) \cdot \exp\left[-\frac{x^2}{\sigma^2}\right] \quad (3)$$

where A is a constant (for example, A=1) and σ is a scale factor chosen as a function of the bandwidth of the original seismic image. The scale factor σ corresponds, for example, to a mean thickness of the estimated seismic horizons.

The method that has just been described is typically implemented in a computer or workstation whose processor executes the above steps under the control of a program, the instructions of which are run by the processor on the seismic images loaded from a storage, e.g. hard drive, memory. The seismic images may be processed as indicated in FIG. 3 or FIG. 5. It is also possible to generate and then store the synthesized images (or even the seismic horizons) before transforming them to return to a seismic representation.

Generally speaking, many variants may be applied to the non-limiting embodiments that have been described, without departing from the scope of the invention. In particular, the method is applicable to three-dimensional seismic images.

The invention claimed is:

1. A method of processing seismic images of the subsurface, comprising the steps of:
   analyzing a seismic image to estimate seismic horizons in an area of the subsurface;
   calculating an accumulation value associated with each pixel of the seismic image by accumulation along a set of estimated seismic horizons to form a synthesized image composed of accumulation values,
      wherein the calculating an accumulation value comprises accumulating signed quantities respectively associated with horizons of said set passing through said pixel, the signed quantity associated with a horizon depending on the sign of an amplitude of a starting pixel of said horizon in the seismic image; and
   transforming the synthesized image to obtain a seismic representation in which signed amplitudes are allocated to the pixels of the synthesized image,
      wherein the transforming the synthesized image comprises a spatial convolution of the synthesized image with a convolution kernel.

2. The method as claimed in claim 1, wherein the signed quantity is equal to +1 if the amplitude of the starting pixel in the seismic image is positive, and −1 if the amplitude of the starting pixel in the seismic image is negative.

3. The method as claimed in claim 1, wherein the spatial convolution is carried out in a vertical direction.

4. The method as claimed in claim 1, wherein the convolution kernel is a wavelet.

5. A method of processing seismic images of the subsurface, comprising the steps of:
   analyzing a seismic image to estimate seismic horizons in an area of the subsurface;
   calculating an accumulation value associated with each pixel of the seismic image by accumulation along a set of estimated seismic horizons to form a synthesized image composed of accumulation values,
   and
   transforming the synthesized image to obtain a seismic representation in which signed amplitudes are allocated to the pixels of the synthesized image,
      wherein the step of transforming the synthesized image comprises combining the synthesized image with the seismic image.

6. The method as claimed in claim 5, wherein the step of calculating an accumulation value associated with a pixel of the seismic image comprises accumulating unitary values respectively associated with horizons of said set passing through said pixel.

7. The method as claimed in claim 5, wherein the combination of the synthesized image with the seismic image is a product per pixel in the form $P(x, y)=A(x, y)^\alpha \times S(x, y)^\beta$, where P(x,y) is the value of a pixel in said seismic representation, A(x, y) is the accumulation value of said pixel in the synthesized image, S(x, y) is the amplitude of said pixel in the seismic image, and α and β are two positive exponents.

8. The method as claimed in claim 7, wherein $\alpha=\frac{1}{2}$ and $\beta=1$.

9. A non-transitory computer-readable medium having stored therein a computer program for a processing system of seismic images of the subsurface, the program comprising instructions for implementing the following steps when the program is run by a computer of the seismic image processing system:
   analyzing a seismic image to estimate seismic horizons in an area of the subsurface;
   calculating an accumulation value associated with each pixel of the seismic image by accumulation along a set of estimated seismic horizons to form a synthesized image composed of accumulation values,
      wherein the calculating an accumulation value associated with a pixel of the seismic image, implemented when the stored program is run by the computer of the seismic image processing system, comprises accumulating signed quantities respectively associated with horizons of said set passing through said pixel, the signed quantity associated with a horizon depending on the sign of an amplitude of a starting pixel of said horizon in the seismic image; and
   transforming the synthesized image to obtain a seismic representation in which signed amplitudes are allocated to the pixels of the synthesized image,
      wherein the step of transforming the synthesized image, implemented when the stored program is run by the computer of the seismic image processing system, comprises a spatial convolution of the synthesized image with a convolution kernel.

10. The non-transitory computer-readable medium as claimed in claim 9, wherein the signed quantity is equal to +1 if the amplitude of the starting pixel in the seismic image is positive, and −1 if the amplitude of the starting pixel in the seismic image is negative.

11. The non-transitory computer-readable medium as claimed in claim 9, wherein the spatial convolution is carried out in a vertical direction.

12. The non-transitory computer-readable medium as claimed in claim 9, wherein the convolution kernel comprises a wavelet.

13. A non-transitory computer-readable medium having stored therein a computer program for a processing system of seismic images of the subsurface, the program comprising instructions for implementing the following steps when the program is run by a computer of the seismic image processing system:
- analyzing a seismic image to estimate seismic horizons in an area of the subsurface;
- calculating an accumulation value associated with each pixel of the seismic image by accumulation along a set of estimated seismic horizons to form a synthesized image composed of accumulation values; and
- transforming the synthesized image to obtain a seismic representation in which signed amplitudes are allocated to the pixels of the synthesized image,
  - wherein the step of transforming the synthesized image, implemented when the stored program is run by the computer of the seismic image processing system, comprises combining the synthesized image with the seismic image.

14. The non-transitory computer-readable medium as claimed in claim 13, wherein the step of calculating an accumulation value associated with a pixel of the seismic image comprises accumulating unitary values respectively associated with horizons of said set passing through said pixel.

15. The non-transitory computer-readable medium as claimed in claim 13, wherein the combination of the synthesized image with the seismic image is a product per pixel in the form $P(x, y) = A(x, y)^\alpha \times S(x, y)^\beta$, where $P(x,y)$ is the value of a pixel in said seismic representation, $A(x, y)$ is the accumulation value of said pixel in the synthesized image, $S(x, y)$ is the amplitude of said pixel in the seismic image, and $\alpha$ and $\beta$ are two positive exponents.

16. The non-transitory computer-readable medium as claimed in claim 15, wherein $\alpha = \frac{1}{2}$ and $\beta = 1$.

* * * * *